(12) United States Patent
Yamamoto et al.

(10) Patent No.: US 9,114,489 B2
(45) Date of Patent: Aug. 25, 2015

(54) METHOD OF ADJUSTING CAPACITIES OF COMBUSTION CHAMBERS OF A MULTI-CYLINDER ENGINE

(75) Inventors: Tsuyoshi Yamamoto, Hiroshima (JP); Yasushi Nakahara, Higashihiroshima (JP); Takayuki Yamada, Hiroshima (JP); Kazuya Hayashi, Higashihiroshima (JP); Yuichiro Ikeda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 954 days.

(21) Appl. No.: 13/100,173

(22) Filed: May 3, 2011

(65) Prior Publication Data

US 2011/0296684 A1 Dec. 8, 2011

(30) Foreign Application Priority Data

Jun. 7, 2010 (JP) ................................. 2010-129634

(51) Int. Cl.
*B23P 13/00* (2006.01)
*B23P 13/02* (2006.01)
*B23P 6/02* (2006.01)

(52) U.S. Cl.
CPC . *B23P 13/02* (2013.01); *B23P 6/02* (2013.01); *F02F 2200/06* (2013.01); *Y10T 29/4927* (2015.01)

(58) Field of Classification Search
CPC ...... B23P 13/00; B23P 13/02; B23P 2700/50; B23P 15/00; B23P 6/02; F02F 2200/06; F02F 2200/04

USPC .............. 29/888.06, 888.01, 888.011, 402.06
See application file for complete search history.

(56) References Cited

U.S. PATENT DOCUMENTS

| 5,228,194 A | * | 7/1993 | Broughton et al. ........ 29/888.05 |
| 5,517,311 A | * | 5/1996 | Takeuchi et al. ............. 356/606 |
| 5,682,850 A | | 11/1997 | Matayoshi |
| 2005/0251999 A1 | * | 11/2005 | Burkhart .................. 29/888.011 |

FOREIGN PATENT DOCUMENTS

| JP | 1158521 U | 11/1989 |
| JP | 6330810 A | 11/1994 |
| JP | 09-119344 A | 5/1997 |

OTHER PUBLICATIONS

Japanese Patent Office, Office Action of Japanese Patent Application No. JP2010-129634, Jun. 25, 2013, 6 pages.

* cited by examiner

*Primary Examiner* — Christopher Besler
(74) *Attorney, Agent, or Firm* — Alleman Hall McCoy Russell & Tuttle LLP

(57) ABSTRACT

This disclosure provides a method of adjusting capacities of combustion chambers of a multi-cylinder engine having a cylinder head with recessed parts that partially form the combustion chambers and a mating surface for mating with a cylinder block, which includes casting a cylinder head material having flat reference surfaces on top of the recessed parts of the cylinder head, machining the cylinder head material to form the mating surface, measuring distances in a height direction from the mating surface to the reference surfaces, respectively, and adjusting machining margins of machining portions of the reference surfaces of the recessed parts based on the measured height direction distances.

13 Claims, 10 Drawing Sheets h1-h4: HEIGHT DIRECTION DISTANCE

2: RECESSED PART
2a: INTAKE PORT SIDE INCLINED SURFACE
2b: EXHAUST PORT SIDE INCLINED SURFACE
10: REFERENCE SURFACE
21: CUTTING PORTION

2: RECESSED PART
10: REFERENCE SURFACE
21: CUTTING PORTION

METHOD OF ADJUSTING CAPACITIES OF COMBUSTION CHAMBERS OF A MULTI-CYLINDER ENGINE

BACKGROUND

The present invention relates to a method of adjusting capacities of combustion chambers of a multi-cylinder engine, and particularly relates to a method of adjusting capacities of combustion chambers of a multi-cylinder engine, in which the combustion chamber capacities of a cylinder head formed by casting are adjusted by using cutting margins of surfaces of the combustion chambers.

Conventionally, because a theoretical thermal efficiency of a spark-ignition gasoline engine increases in proportion to a compression ratio up to about 17:1, the increase of the compression ratio is proposed as an effective means for improving fuel consumption. Further, a pent-roof combustion chamber in which an intake port side inclined surface and an exhaust port side inclined surface are formed in a roof shape is known as a combustion chamber structure effective for realizing a high compression ratio. The pent-roof combustion chamber is considered to be an effective structure because a comparatively large diameter can be secured for intake and exhaust valves, a combustion chamber capacity can be made smaller in comparison to a cylinder capacity, and it is convenient in controlling a flow, such as a tumble flow (vertical whirling flow inside the cylinder) or a swirling flow (horizontal whirling flow inside the cylinder) of intake air inside the cylinder.

A cylinder head of a spark-ignition gasoline engine disclosed in JP H9-119344A includes, in a single cylinder, two intake ports and two exhaust ports, an ignition plug hole, and a cooling water passage. A part of the cooling water passage that will be located below the intake ports is formed by a metal casting mold serving as a lower surface main mold of the cylinder head, and a part of the cooling water passage that will not be below the intake ports is formed by a sand core. These parts of the cooling water passage are manufactured to communicate with each other via a mechanical fabrication operation after casting. In such a cylinder head including pent-roof combustion chambers, the part of the cooling water passage that will be arranged below the intake ports is formed by a metal casting mold, therefore the casting quality can be raised by preventing a sand core for forming the cooling water passage that will be arranged below the intake ports from being damaged, and the anti-knocking ability can be improved by precisely controlling the dimensions and thus the capacity of the cooling water passage.

Theoretically, a compression ratio ε can be calculated from the following equation.

$$\epsilon = ((\pi/4) \times b^2 \times s + V)/V$$

In the equation, "b" indicates a bore diameter of the cylinder, "s" indicates a stroke length of a piston, and "V" indicates the combustion chamber capacity. When increasing the compression ratio, an abnormal combustion, such as knocking, pre-ignition, or detonation, easily occurs. Therefore, combustion is normally controlled to suppress abnormal combustion by delaying an ignition timing by a predetermined time period according to a preset compression ratio from the point when the piston reaches the top dead center in the compression stroke.

A method of metal mold casting where a molten metal is filled into a molding cavity is utilized in manufacturing the cylinder head, and a method of low pressure casting utilizing a comparatively low pressure (e.g., about 0.5 kg/cm² or below) is often adopted in manufacturing a casting product made of light alloy such as an aluminum alloy. The molten metal filled into the molding cavity is solidified after a predetermined time has elapsed to form a cylinder head material. Then, the cylinder head material is demolded from the metal casting mold, and, as a post process, the demolded cylinder head is cut to form, for example, a mating surface for mating with a cylinder block. For this reason, even if the molding cavity is precisely formed for producing the combustion chambers with a target capacity within the metal casting mold, the cooling characteristics of the molten metal may differ among the cylinders and a shrinkage difference may occur in the combustion chambers of the cylinders due to, for example, the solidification characteristics.

If the shrinkage difference due to the solidification characteristics occurs in the combustion chambers of the cylinder head material, the combustion chamber capacities of the cylinders vary, thereby a uniform combustion among the cylinders cannot be obtained and the combustion status of the engine may negatively be affected. Further, in a high compression ratio engine, if a balance among a predetermined fuel supply amount, the compression ratio, and the ignition timing is lost, the abnormal combustion as described above may occur.

SUMMARY

The present invention has an object to provide a method of adjusting capacities of combustion chambers of a multi-cylinder engine, in which, in a cylinder head formed by casting, an influence to combustion due to a shrinkage difference in combustion chambers of cylinders can be suppressed and an abnormal combustion can be suppressed even if a compression ratio is set high.

According to an aspect of the present invention, a method of adjusting capacities of combustion chambers of a multi-cylinder engine having a cylinder head with recessed parts that partially form the combustion chambers and a mating surface for mating with a cylinder block is provided, which includes casting a cylinder head material having flat reference surfaces on top of the recessed parts of the cylinder head, machining the cylinder head material to form the mating surface, measuring distances in a height direction from the mating surface to the reference surfaces, respectively, and adjusting machining margins of machining portions of the surfaces of the recessed parts based on the measured height direction distances.

As described above, the method of adjusting the combustion chamber capacities of the multi-cylinder engine includes casting the cylinder head material having the flat reference surfaces at the tops of the recessed parts of the cylinder head. Therefore, the reference surfaces can be formed in positions where shrinkage differences in combustion chamber capacities are most reflected, that is at the tops of the recessed parts which are most distant in the respective combustion chambers of the cylinder block from the mating surface. Further, the reference surfaces are formed at the tops of the recessed parts of the cylinder head. Therefore, flows of an intake air inside the cylinders are not interrupted and an influence in combustion can be prevented.

Further, the reference surfaces are formed at the tops of the recessed parts of the cylinder head, where the shrinkage differences in combustion chamber capacities is most reflected, and the height direction distances from the mating surface for mating with the cylinder block to the reference surfaces are measured respectively. Therefore, the shrinkage differences in combustion chamber capacities of the cylinder head material with respect to the target combustion chamber capacity can be determined by using the height direction distances as parameters. The machining margins of the machining portions of the recessed part surfaces are adjusted based on the height direction distances. Therefore, the combustion chamber capacities can be adjusted to the target capacity, the influence in combustion due to the shrinkage differences in combustion chamber capacities can be suppressed, and, even if a compression ratio of the engine is set high, an abnormal combustion can be suppressed.

In one embodiment, the combustion chamber may be a pent-roof combustion chamber having an intake port side inclined surface and an exhaust port side inclined surface. The reference surface may be provided at a boundary between the intake port side inclined surface and the exhaust port side inclined surface. The adjusting the machining margins may include machining an opening edge portion of the recessed part over an area from an intake port to an exhaust port based on the measured height direction distance, the opening edge portion serving as the machining portions.

As described above, the reference surface is provided at the boundary between the intake port side inclined surface and the exhaust port side inclined surface. Therefore, the flat reference surface that is convenient in measurement can easily be formed. Further, the adjusting the machining margins includes machining the opening edge portion of the recessed part over the area from the intake port to the exhaust port based on the measured height direction distance, the opening edge portion serving as the machining portions. Therefore, both a reduction of an influence in combustion and easy adjustments of the capacities can be realized while the shape of the pent-roof combustion chamber is maintained.

In one embodiment, the casting the cylinder head material may include forming the machining portions of the recessed parts to have a predetermined machining margin with respect to a target combustion chamber capacity.

As described above, the casting the cylinder head material includes forming the machining portions of the cylinder head material so that the machining portions have the predetermined machining margin with respect to the target combustion chamber capacity in advance. Therefore, it is designed to allow the adjustments of increasing in size in addition to reducing in size of the combustion chamber capacities, and, thereby, the adjustment can be performed over a wide range.

In one embodiment, the adjusting the machining margins may include setting the machining margins smaller when the measured height direction distance is larger than a reference height direction distance and setting the machining margins larger when the measured height direction distance is smaller than the reference height direction distance.

As described above, the adjustments can easily be performed by comparing the measured height direction distance and the reference height direction distance.

In one embodiment, the multi-cylinder engine may have a compression ratio of 12:1 or higher.

As described above, when the compression ratio of the engine is a high compression ratio, an abnormal combustion, such as knocking, pre-ignition, or detonation, can be suppressed.

BRIEF DESCRIPTION OF THE DRAWINGS

FIG. 9a is a plan view and FIG. 9b is a vertical cross sectional view.

DESCRIPTION OF EMBODIMENT

Figure 1:
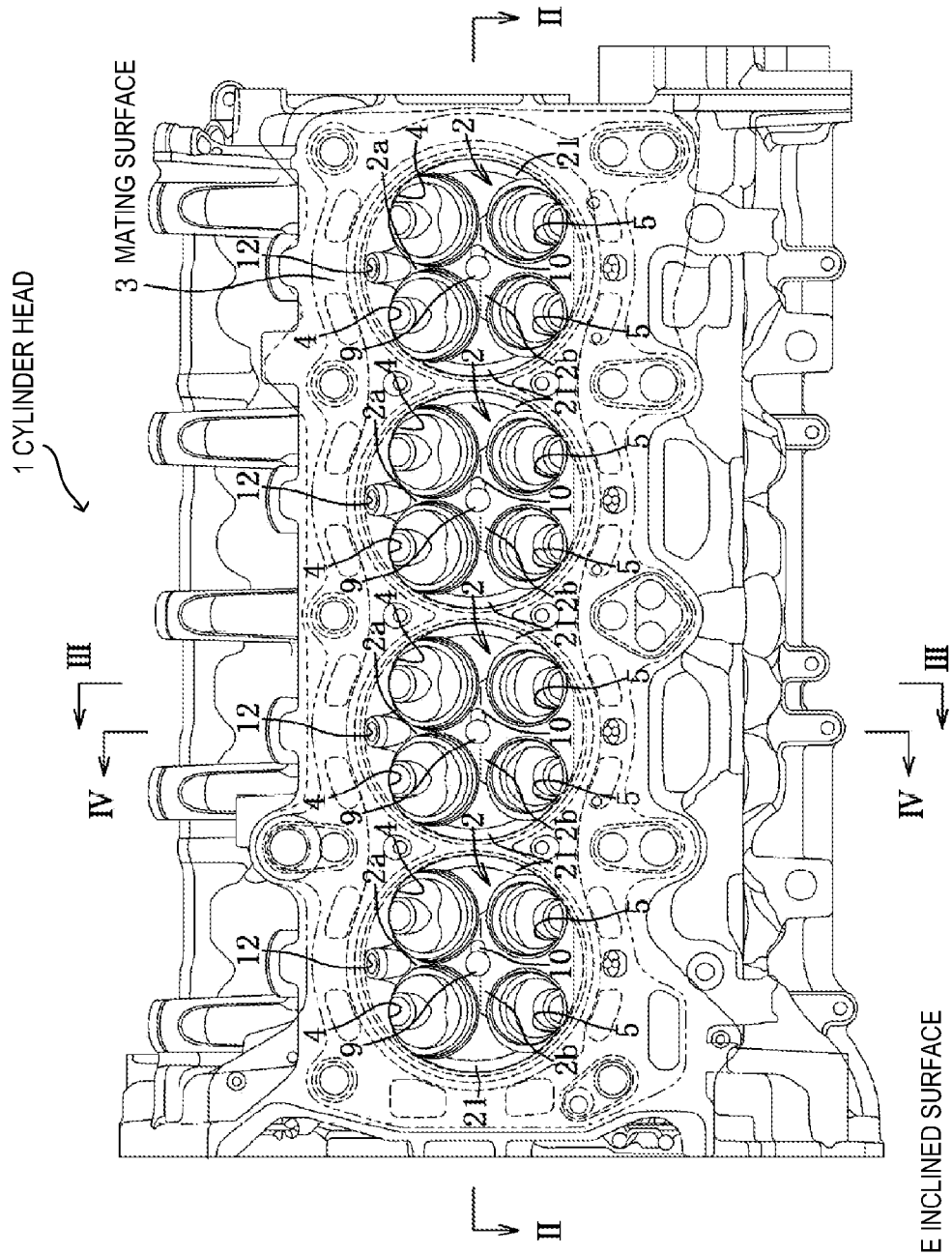
FIG. 1 is a view showing a cylinder head seen from below according to one embodiment of the invention.

Hereinafter, embodiments for carrying out the present invention are described in detail.
First Embodiment Hereinafter, a first embodiment of the present invention is described in detail with reference to FIGS. 1 to 9.

In an inline-four engine, a cylinder head material is formed by integral casting using a metallic material such as an aluminum alloy and a cutting portion of the cylinder head material is cut to form a cylinder head 1. The engine equipped with the cylinder head 1 is a high compression ratio engine where a compression ratio is set to 14:1, and a fuel supply amount and an ignition timing are controlled according to the compression ratio.

Firstly, a structure of the cylinder head 1 after the cutting work is described.

The cylinder head 1 includes four recessed parts 2 each partially forming a combustion chamber of the cylinder, and a mating surface 3 for mating with a cylinder block (not illustrated). The cylinder head 1 is attached to an upper part of the cylinder block. Hereinafter, the configuration of one of the cylinders is described because the four cylinders have a similar configuration.

The recessed part 2 in conjunction with a circumferential wall surface of a cylinder bore (not illustrated) formed in the cylinder block and a top surface of a head part of a piston (not illustrated) forms a part of the combustion chamber having a pent-roof shape. The recessed part 2 is formed with an intake port side inclined surface 2a and an exhaust port side inclined surface 2b continuing from the intake port side inclined surface 2a with a blunt angle therebetween at the top of the recessed part 2. A boundary at the top of the recessed part 2 between the intake port side inclined surface 2a and the exhaust port side inclined surface 2b is formed in line along the array direction of the cylinders.

Figure 2:
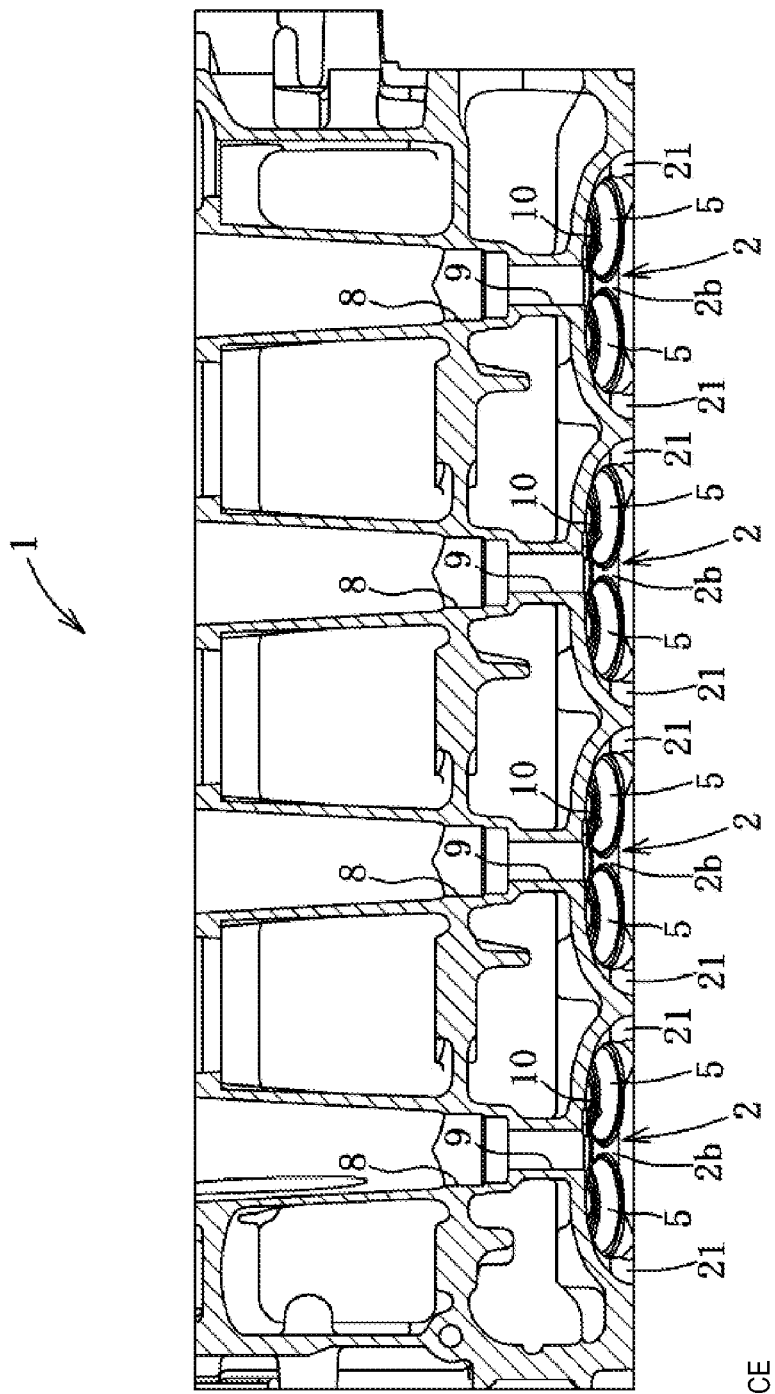
FIG. 2 is a cross sectional view taken along a line II-II of FIG. 1.
Figure 5:
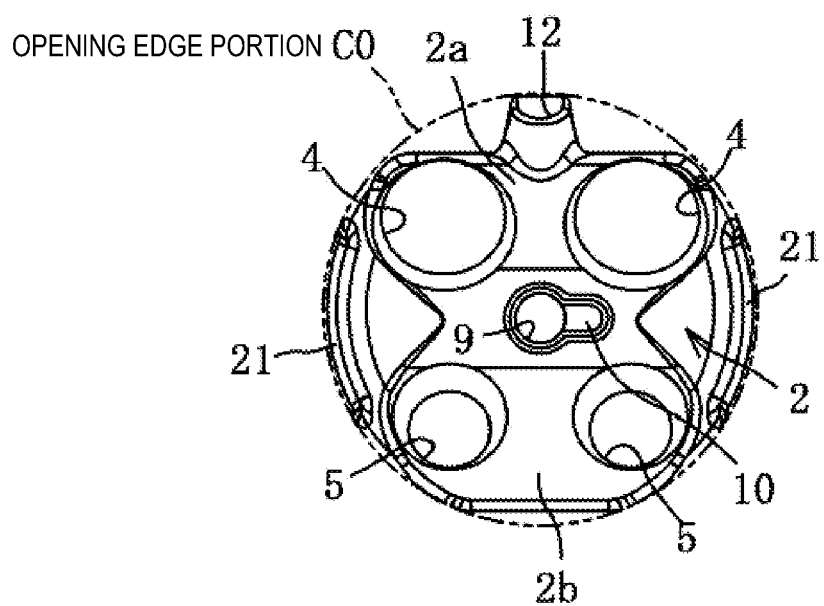
FIG. 5 is a front view of a recessed part of a combustion chamber with respect to FIG. 1.

As shown in FIGS. 1, 2 and 5, a pair of cutting portions 21 facing each other are provided in a circular opening edge portion C0 of the recessed part 2 over areas between an intake port 4 and an exhaust port 5. The cutting portions 21 are formed in an arc shape in a plan view over the areas between a side portion of the intake port side inclined surface 2a and a side portion of the exhaust port side inclined surface 2b, and are arranged in the cylinder array direction with respect to the recessed part 2.

Two intake ports 4 are formed in the intake port side inclined surface 2a, and an annular valve sheet (not illustrated) is press fitted to each peripheral edge portion of the openings for the intake ports 4. And similarly, two exhaust ports 5 are formed in the exhaust port side inclined surface 2b, and an annular valve sheet (not illustrated) is press fitted to each peripheral edge portion of the openings for the exhaust ports 5. Intake air valve supporting bosses surrounding bore holes 6 are formed outside of the combustion chamber and communicate with the intake ports 4, and valve guides for being inserted through with stem portions of intake valves (not illustrated), respectively, are provided inside the intake valve supporting bosses surrounding bore holes 6. Exhaust air valve supporting bosses surrounding bore holes 7 are formed outside of the combustion chamber and communicate with the exhaust ports 5, and valve guides for being inserted through with stem portions of exhaust valves (not illustrated), respectively, are provided inside the exhaust valve supporting boss surrounding bore holes 7.

Figure 4:
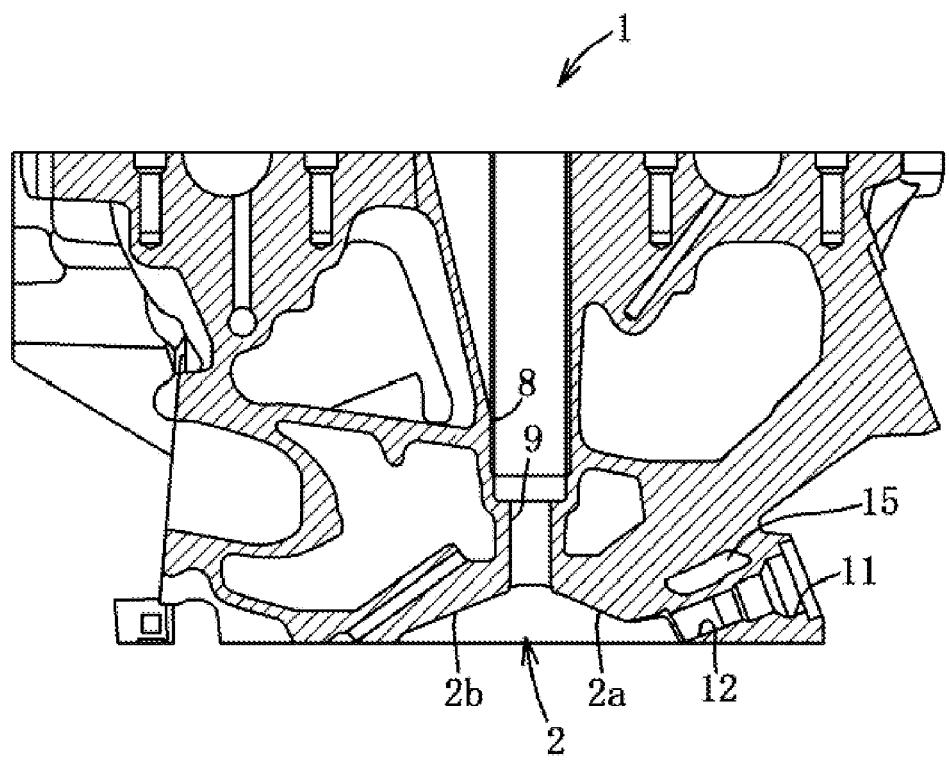
FIG. 4 is a cross sectional view taken along a line IV-IV of FIG. 1.

As shown in FIGS. 2 and 4, an ignition plug attaching boss part surrounding insertion opening 8 and an ignition plug attaching hole 9 for accommodating an ignition plug (not illustrated) therein are formed along a central axis of the combustion chamber (axis of reciprocating movement direction of the piston). The ignition plug is inserted from above the cylinder head 1 into the ignition plug attaching hole 9, and, by engaging a male thread of the ignition plug and a female thread of the ignition plug attaching hole 9, the ignition plug is fixed to the cylinder head 1 while its tip end part faces the combustion chamber. The ignition plug attaching hole 9 is not formed in the casting of the cylinder head material and is formed by a separate fabrication work that is performed after the casting.

At the top of the recessed part 2 of the cylinder head 1, a flat reference surface 10 is formed to be substantially in parallel to the mating surface 3 for mating with the cylinder block. The reference surface 10 is provided at the boundary between the intake port side inclined surface 2a and the exhaust port side inclined surface 2b so as to be adjacent to the ignition plug attaching hole 9. In the recessed part 2 of the combustion chamber, the flat reference surface 10 is arranged in a position most distant from the mating surface 3. The reference surface 10 is formed by a metal casting mold in the casting, which means that it is formed in advance in the cylinder head material after being demolded from the mold.

Figure 3:
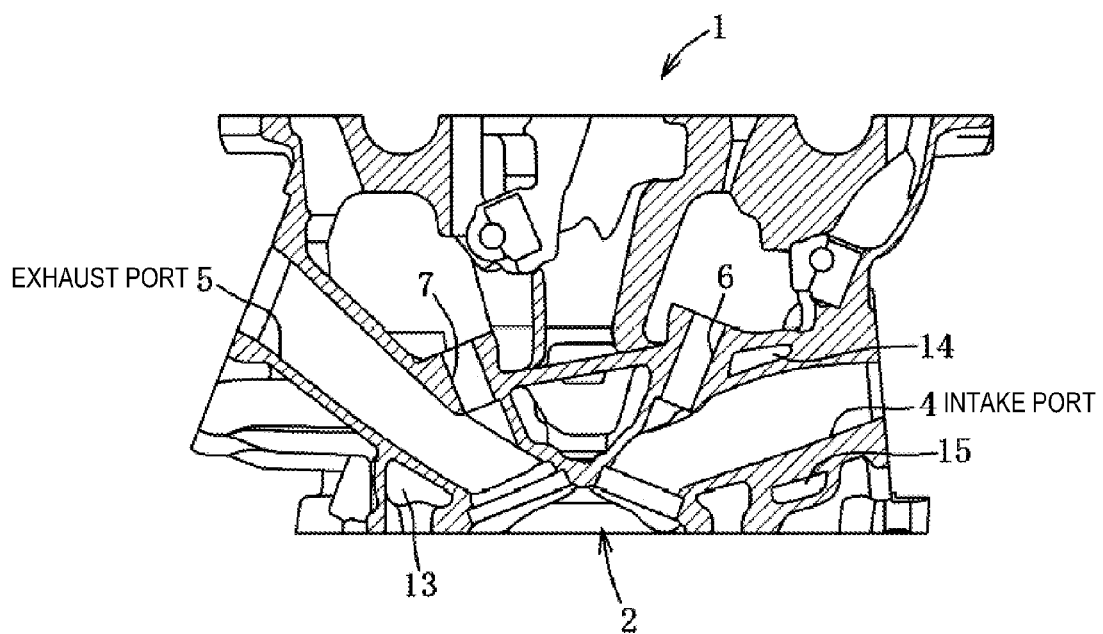
FIG. 3 is a cross sectional view taken along a line III-III of FIG. 1.

As shown in FIGS. 1, 3 and 4, in a position between and below the two intake ports 4, a fuel injection valve attaching boss surrounding bore hole 11 is provided and a fuel injection valve attaching hole 12 for accommodating a fuel injection valve (not illustrated) therein is formed. The fuel injection valve is inserted into the fuel injection valve attaching hole 12 from side of the cylinder head 1 and is fixed to the fuel injection valve attaching boss 11 by being pushed obliquely downward. The fuel injection valve attaching hole 12 does not exist in the cylinder head material when demolded, but is formed via a mechanical fabrication operation after casting.

Inside the cylinder head 1, a plurality of water jackets 13, 14, and 15 where cooling fluid flows therein are formed in positions near cooling required portions. The water jackets 13, 14, and 15 are formed by a sand core arranged in the metal casting mold in the casting, and are formed in the cylinder head material when demolded.

Figure 6:
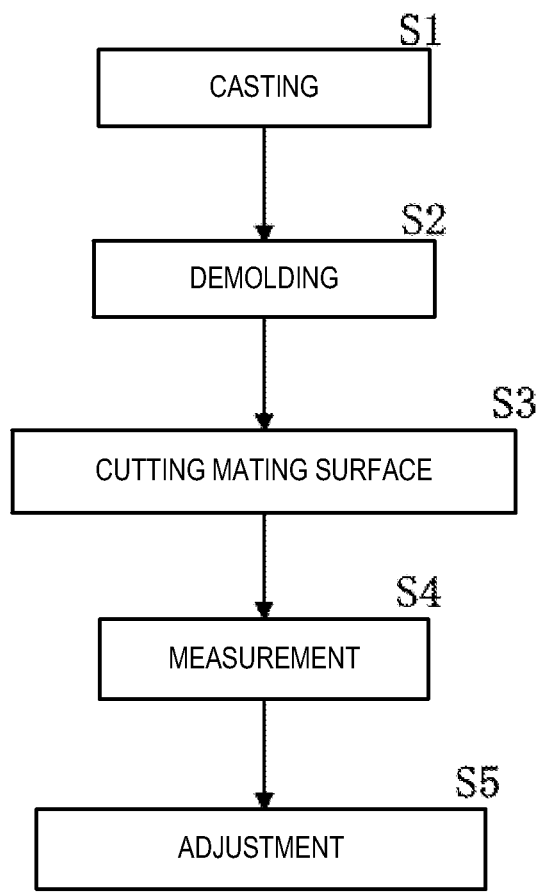
FIG. 6 is a flow chart showing a procedure of adjusting combustion chamber capacities.

Next, operation procedures relating to a method of adjusting capacities of the combustion chambers of the cylinder head 1 is described with reference to FIG. 6. Note that "Si" (i=1, 2 . . . ) in FIG. 6 indicates each process in the method of adjusting the combustion chamber capacities.

First, in S1, the casting of the cylinder head material including the flat reference surfaces 10 at the tops of the recessed parts 2 of the cylinder head 1 is performed in a low-pressure environment.

In the casting, a molding cavity for forming the cylinder head material is formed by arranging a plurality of sand cores corresponding to the shapes of the intake port 4 and the exhaust port 5 so as to be fixed between an upper mold and a lower mold, and a molten metal is filled into the molding cavity.

Shape portions for forming the pairs of cutting portions 21 and the reference surfaces 10 for the cylinders in the cylinder head material are formed in advance in the lower mold for forming the surfaces of the recessed parts 2. The shape portions for forming the cutting portions 21 are formed to have a predetermined cutting margin with respect to a target combustion chamber capacity (a combustion chamber capacity of a finished molded piece).

After mold clamping of the upper mold and the lower mold, the molten aluminum alloy (the molten metal) pressured by a comparatively low pressure (0.5 kg/cm$^2$) is filled into the cavity.

After a predetermined time has elapsed since the molten aluminum alloy is filled into the cavity (after a solidification of the molten material), the upper mold and the lower mold are opened and the cylinder head material is demolded from the mold and taken out (S2).

The cylinder head material has the portions, such as the intake ports 4, the exhaust ports 5, and the reference surfaces 10, formed in advance by the upper and lower molds and the sand cores.

Next, in S3, the cylinder head material is worked to form the mating surface 3 for mating with the cylinder block. The mating surface 3 is a reference position for measurement (S4) and adjustment (S5), described as follows.

In S4, distances h in a height direction from the mating surface 3 to the reference surfaces 10 of the cylinder head 1 are measured, respectively. In the measurement, differences (shrinkage difference) between the target combustion chamber capacity V0 of the final molded article and the combustion chamber capacities V of the cylinder head material are determined based on the height direction distances h corresponding to depths of the combustion chambers.

When the target combustion chamber capacity is "V0", a height direction distance in the combustion chamber capacity V0 is "h0", a bottom dimension of the recessed part 2 in the combustion chamber capacity V0 is "S0", and a factor is "K", the following equation is established.

$$V0 = K \times S0 \times h0$$

Similarly, when the combustion chamber capacity of the cylinder head material is "V", the height direction distance in the combustion chamber capacity V is "h", and a bottom dimension of the recessed part 2 in the combustion chamber capacity V is "S", the following equation is established.

$$V = K \times S \times h$$

Here, S0 and S are substantially the same dimension, therefore the shrinkage difference (V−V0) can be expressed by using a difference between the height direction distance (h−h0) as a parameter. Note that the combustion chamber capacities V0 and V are the capacities of the combustion chambers when the piston reaches top dead center in the chamber.

Figure 7:
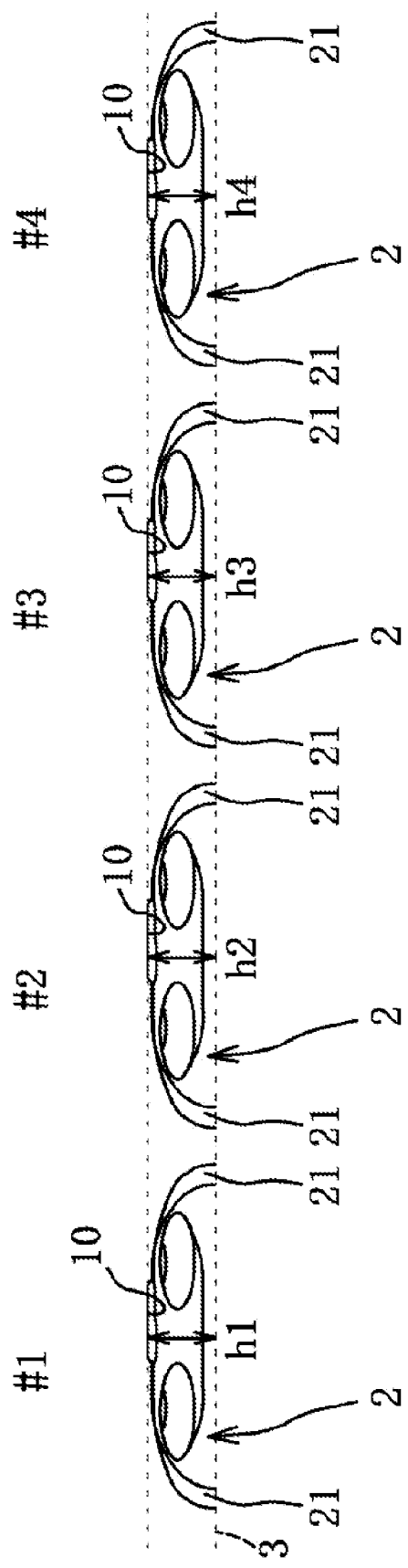
FIG. 7 is a vertical cross-sectional view of the recessed part of the combustion chamber of a cylinder.

Thereby, as shown in FIG. 7, height direction distances h1-h4 from the mating surface 3 to the reference surfaces 10 are measured for first to fourth cylinders #1-#4, respectively, by a predetermined measuring means. Note that the target combustion chamber capacity V0 and the height direction distance h0 in the combustion chamber capacity V0 are set in advance according to a design condition of the engine.

In S5, the cutting margins x of the cutting portions 21 in the surfaces of the recessed parts 2 are adjusted based on the measured height direction distances h1-h4. The cutting portions 21 are cut based on the height direction distances h1-h4 measured in S4.

Figure 8:
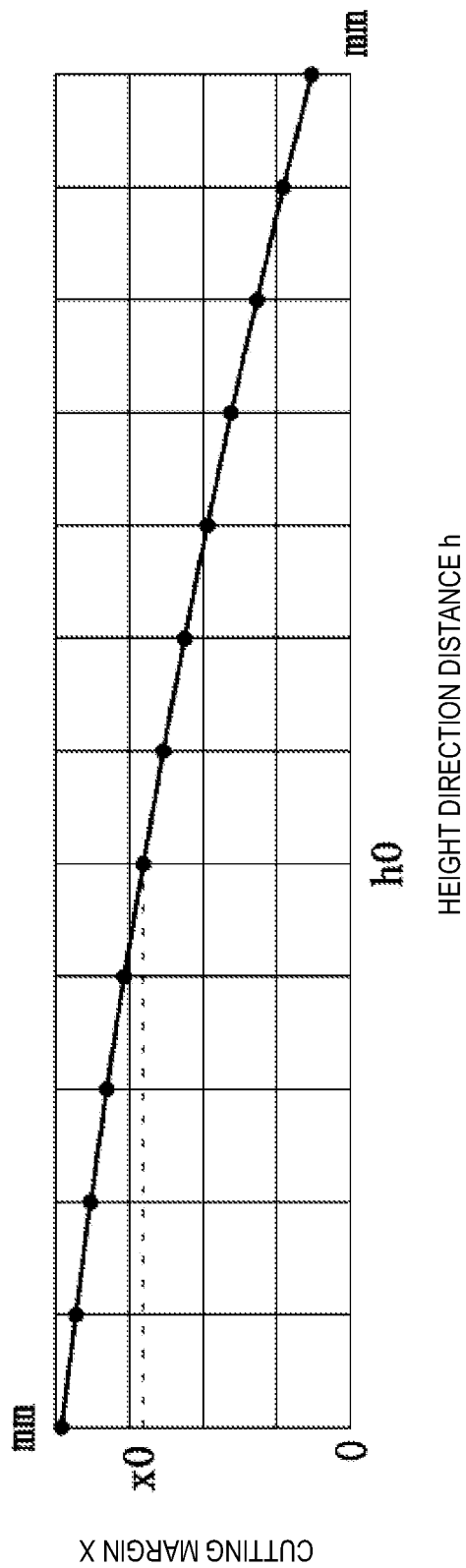
FIG. 8 is a chart showing a correlation between a distance of the recessed part in a height direction and a cutting margin of the recessed part.

As shown in FIG. 8, there is a correlation between the height direction distance h (combustion chamber depth) and the cutting margin x (cutting depth of the cutting portions 21). In the correlation, the reference position (origin position) of the cutting margin x corresponds to the height of the mating surface 3. Therefore, the cutting margins x are set smaller when the measured height direction distance is larger than the reference height direction distance h0 and set larger when the measured height direction distance h is smaller than the reference height direction distance h0. In the correlation chart in FIG. 8, an increment in the horizontal axis represents 0.05 mm and that in the vertical axis represents 0.5 mm.

Figure 9:
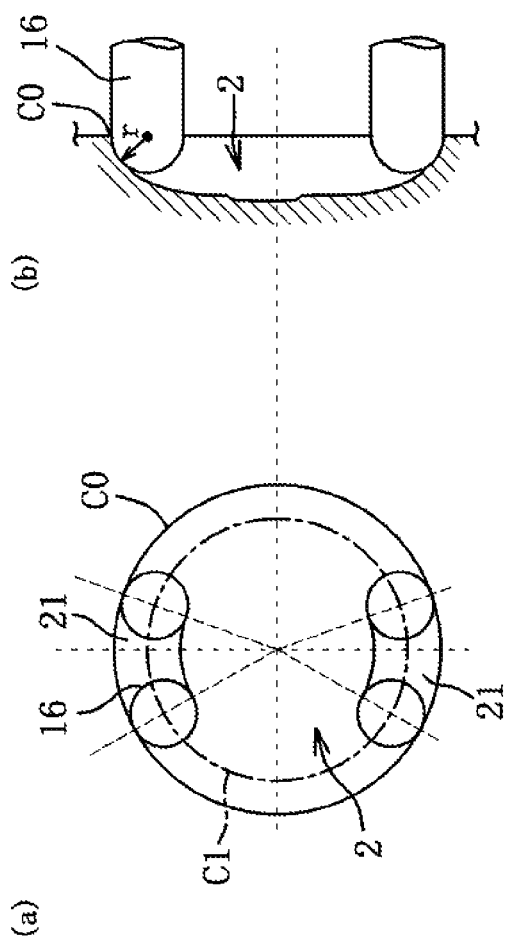
FIGS. 9a-9b are views showing an adjustment machining operation by a ball end mill, where

The cutting portions 21 are formed to have a predetermined cutting margin x0 with respect to the target combustion chamber capacity V0, therefore, even when the measured height direction distance h has the same value as the height direction distance h0 in the combustion chamber capacity V0, the cutting work is performed by a ball end mill 16 (see FIG. 9).

In S5, the cutting margins x1-x4 are set based on the height direction distances h1-h4, and the cutting work is performed so that the cutting depths of the first to fourth cylinders #1-#4 reach the corresponding cutting margins x1-x4. In adjusting the recessed part 2 of the first cylinder #1, the ball end mill 16 having a semicircular cutting edge portion with a radius r is moved so that the center of the semicircle is moved from the mating surface 3 toward the cutting depth direction (direction toward the reference surface 10) by the cutting margin x1 based on the height direction distance h1. As shown in the parts (a) and (b) of FIG. 9, the ball end mill 16 is moved over the areas of the cutting portions 21 by having a circle C1 as a moving path which is set inward from the circular opening edge portion C0 by a predetermined amount. In this embodiment, the distance between the circular opening edge portion C0 and the circle C1 is set to be the same as the cutting edge portion radius r of the ball end mill 16, and outer edge positions between the intake port 4 and the exhaust port 5 are fixed regardless of the value of the combustion chamber capacity V. Hereinafter, the recessed parts 2 of the second to fourth cylinders #2-#4 are similarly adjusted. Then the ignition plug attaching holes 9 and the fuel injection valve attaching holes 12 are formed by the mechanical fabrication work.

Next, functions and effects of the method of adjusting the combustion chamber capacities according to the first embodiment are described in detail.

The method of adjusting the combustion chamber capacities is utilized for a multi-cylinder engine where the plurality of cylinders are arranged in line, and includes the cylinder head 1 having the recessed parts 2 that partially form the combustion chambers of the cylinders and the mating surface 3 for mating with the cylinder block. The method of adjusting the combustion chamber capacities includes the casting the cylinder head material having the flat reference surfaces 10 on top of the recessed parts 2 of the cylinder head 1 (S1), the cutting the cylinder head material to form the mating surface 3 for mating with the cylinder block (S3), the measuring the height direction distances h from the mating surface 3 of the cylinder head 1 to the reference surfaces 10, respectively (S4), and the adjusting the cutting margins x of the cutting portions 21 of the surfaces of the recessed parts 2 based on the measured height direction distances h (S5).

According to the method of adjusting the combustion chamber capacities, the reference surfaces 10 are formed at the tops of the recessed parts 2 of the cylinder head 1, where the shrinkage differences in the combustion chamber capacities V are most reflected, and the height direction distances h from the mating surface 3 for mating with the cylinder block to the reference surfaces 10 are measured respectively. Therefore, the shrinkage differences in the combustion chamber capacities V of the cylinder head material with respect to the target combustion chamber capacity V0 can be determined by using the height direction distance h as a parameter. Further, the cutting margins x of the cutting portions 21 of the recessed part surfaces are adjusted based on the height direction distances h. Therefore, the combustion chamber capacity V can be adjusted to the target combustion chamber capacity V0, an influence in combustion due to the shrinkage differences in the combustion chamber capacities V can be suppressed, and an abnormal combustion can be suppressed even if the compression ratio is set high.

The combustion chamber is the pent-roof combustion chamber having the intake port side inclined surface 2a and the exhaust port side inclined surface 2b. The reference surface 10 is provided at the boundary between the intake port side inclined surface 2a and the exhaust port side inclined surface 2b. Further, in the adjustment S5, the opening edge portion C0 of the recessed part 2 over the area from the intake port 4 to the exhaust port 5 is cut as the cutting work target portions 21 based on the measured height direction distance h. Thereby, the flat reference surface 10 that is convenient in measurement can easily be formed, and both the reduction of the influence to the combustion and the easy adjustment of the capacity can be realized while the shape of the pent-roof combustion chamber is maintained.

In the casting S1, the cutting portions 21 of the recessed parts 2 are formed to have the cutting margin x0 with respect to the target combustion chamber capacity V0. Therefore, it is designed to allow the adjustments of increasing in size in addition to reducing in size of the combustion chamber capacities, and, thereby, the adjustment can be performed over a wide range.

In the adjustment S5, the cutting margins x are set smaller when the measured height direction distance h is larger than the reference height direction distance h0, and are set larger when the measured height direction distance h is smaller than the reference height direction distance h0. Therefore, the adjustments can easily be performed by comparing the measured height direction distance h and the reference height direction distance h0.

As described above, even when the compression ratio of the multi-cylinder engine is set at 14:1, the abnormal combustion such as knocking, pre-ignition, or detonation of the engine can be suppressed.

Next, modified embodiments in which the embodiment described above is partially changed are described. (1) In the above embodiment, the example of the adjustment where the outer edge positions of the recessed parts 2 between the intake port and the exhaust port are fixed is described. However, if the dimension between the cylinders can be properly obtained in the mating surface, the cutting can be performed so that the outer edge positions between the intake port and the exhaust port are set closer toward the center of the combustion chamber.

Figure 10:
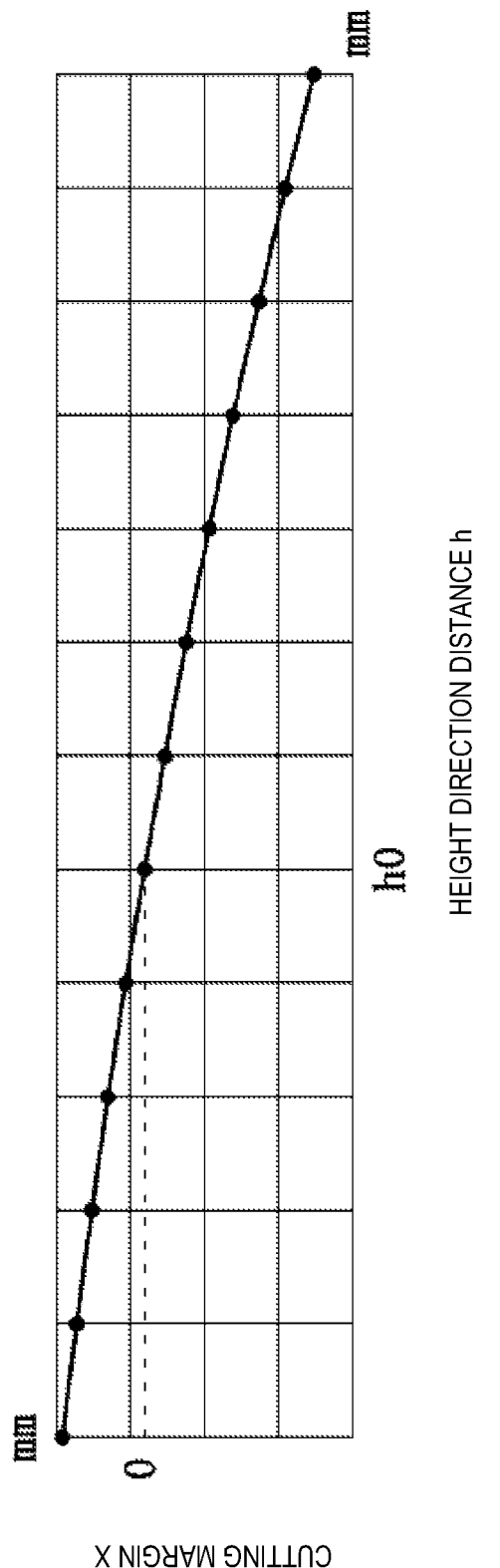
FIG. 10 is a chart showing a correlation between a distance of the recessed part in a height direction and a cutting margin of the recessed part according to a modified embodiment of the invention.

As shown in FIG. 10, in the modified embodiment, the intermediate position (origin position) of the cutting margin x corresponds to the height position from the mating surface, and the cutting margin x is set smaller when the measured height direction distance h is larger than the reference height direction distance h0 and is set larger when the measured height direction distance h is smaller than the reference height direction distance h0. The adjustment is effective in adjusting the combustion chamber capacities of the cylinder head where the bore diameter is small and the space between the intake port and the exhaust port is difficult to be secured.

(2) In the above embodiment, the example where the ignition plug hole and the fuel injection valve attaching hole are formed after the adjustment is described. However, the portions requiring mechanical fabrication work, such as the ignition plug hole and the fuel injection valve attaching hole, may be fabricated in the adjustment similarly to the cutting portion.

(3) In the above embodiment, the example of the engine where the compression ratio is 14:1 is described. However, the engine needs to have at least a high compression ratio, and as long as the compression ratio is 12:1 or higher, the similar effects as the above embodiment can be obtained.

(4) Further, the present invention may be implemented in other various modified embodiments that can be performed by those skilled in the art by applying various changes to the above embodiment in a range not deviating from the spirit and scope of the invention.

According to the present invention, by using the cutting margins of the combustion chamber surfaces to adjust the capacities of the combustion chambers of the cylinder head molded by casting, the influence to combustion due to the shrinkage difference of the combustion chamber of the cylinder can suppressed and, even if the compression ratio is set high, the abnormal combustion can be suppressed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of forming a cylinder head for a multi-cylinder engine and adjusting capacities of combustion chambers of the multi-cylinder engine having the cylinder head, the cylinder head including recessed parts that partially form the combustion chambers, which are formed as pent-roof combustion chambers having an intake port, an intake port side inclined surface, an exhaust port, an exhaust port side inclined surface, and a mating surface for mating with a cylinder block, the method comprising:
   casting a cylinder head material having flat reference surfaces on top of the recessed parts of the cylinder head at a boundary between the intake port side inclined surface and the exhaust port side inclined surface;
   machining the cylinder head material to form the mating surface;
   after the machining of the cylinder head material to form the mating surface, measuring distances in a height direction from the mating surface to the reference surfaces in preparation for adjusting machining margins up to a boundary with the mating surface;
   adjusting machining margins of machining portions of the reference surfaces of the recessed parts based on the measured height direction distances after the machining of the cylinder head material to form the mating surface, independently of the machining of the cylinder head material to form the mating surface; and
   wherein the step of adjusting the machining margins includes machining an arc-shaped portion of the recessed part encircling the intake port and the exhaust port based on the measured height direction distance, as far as the boundary with the mating surface, the boundary with the mating surface being adjacent to an outer edge of the recessed part that at least partially encircles the intake port, exhaust port, reference surface, and the recessed part, the arc-shaped portion serving as the machining portions, the machining portions being portions of the reference surfaces to be machined during the adjusting step.

2. The method of claim 1, wherein the adjusting the machining margins includes setting the machining margins smaller when the measured height direction distance is larger than a reference height direction distance and setting the machining margins larger when the measured height direction distance is smaller than the reference height direction distance.

3. The method of claim 1, wherein the casting the cylinder head material includes forming the machining portions of the recessed parts to have a predetermined machining margin with respect to a target combustion chamber capacity.

4. The method of claim 3, wherein the adjusting the machining margins includes setting the machining margins smaller when the measured height direction distance is larger than a reference height direction distance and setting the machining margins larger when the measured height direction distance is smaller than the reference height direction distance.

5. The method of claim 1, wherein the casting the cylinder head material includes forming the machining portions of the recessed parts to have a predetermined machining margin with respect to a target combustion chamber capacity.

6. The method of claim 5, wherein the adjusting the machining margins includes setting the machining margins smaller when the measured height direction distance is larger than a reference height direction distance and setting the machining margins larger when the measured height direction distance is smaller than the reference height direction distance.

7. The method of claim 1, wherein the adjusting the machining margins includes setting the machining margins smaller when the measured height direction distance is larger than a reference height direction distance and setting the machining margins larger when the measured height direction distance is smaller than the reference height direction distance.

8. The method of claim 1, wherein the multi-cylinder engine has a compression ratio of 12:1 or higher.

9. A method of forming a cylinder head for a multi-cylinder engine and adjusting capacities of combustion chambers of the multi-cylinder engine having the cylinder head, the cylinder head including recessed parts that partially form the combustion chambers, which are formed as pent-roof combustion chambers having an intake port, an intake port side inclined surface, an exhaust port, an exhaust port side inclined surface, and a mating surface for mating with a cylinder block, the method comprising:
   casting a cylinder head material having flat reference surfaces on top of the recessed parts of the cylinder head at a boundary between the intake port side inclined surface and an exhaust port side inclined surface;
   machining the cylinder head material to form the mating surface;
   after the machining of the cylinder head material to form the mating surface, measuring distances in a height direction from the mating surface to the reference surfaces in preparation for adjusting machining margins up to a boundary with the mating surface; and adjusting machining margins of machining portions of the reference surfaces of the recessed parts based on the measured height direction distances after the machining of the cylinder head material to form the mating surface, independently of the machining of the cylinder head material to form the mating surface, wherein the adjusting is accomplished at least in part by machining an arc-shaped portion of the recessed parts encircling the intake port and the exhaust port based on the measured height direction distances, as far as the boundary with the mating surface, the boundary with the mating surface being adjacent to an outer edge of the recessed part that at least partially encircles the intake port, exhaust port, reference surface, and the recessed part, the arc-shaped portion serving as the machining portions of the reference surfaces, the machining portions being portions to be machined during the adjusting step;

wherein the casting the cylinder head material includes forming the machining portions of the recessed parts to have a predetermined machining margin with respect to a target combustion chamber capacity; and wherein the multi-cylinder engine has a compression ratio of 12:1 or higher.

10. A method of forming a cylinder head for a multi-cylinder engine and adjusting capacities of combustion chambers of the multi-cylinder engine having the cylinder head, the cylinder head including recessed parts that partially form the combustion chambers and a mating surface for mating with a cylinder block, the method comprising:

casting a cylinder head material having flat reference surfaces on top of the recessed parts of the cylinder head;

machining the cylinder head material to form the mating surface;

after the machining of the cylinder head material to form the mating surface, measuring distances in a height direction from the mating surface to the reference surfaces in preparation for adjusting machining margins up to a boundary with the mating surface; and adjusting machining margins of machining portions of the reference surfaces of the recessed parts based on the measured height direction distances after the machining of the cylinder head material to form the mating surface, independently of the machining of the cylinder head material to form the mating surface;

wherein the combustion chamber is a pent-roof combustion chamber having an intake port, an intake port side inclined surface, an exhaust port, and an exhaust port side inclined surface;

wherein the reference surface is provided at a boundary between the intake port side inclined surface and the exhaust port side inclined surface;

wherein the adjusting the machining margins includes machining arc-shaped portion of the recessed part encircling the intake port and the exhaust port based on the measured height direction distance, as far as the boundary with the mating surface, the boundary with the mating surface being adjacent to an outer edge of the recessed part that at least partially encircles the intake port, exhaust port, reference surface, and the recessed part, the arc-shaped portion serving as the machining portions;

wherein the casting the cylinder head material includes forming the machining portions of the recessed parts to have a predetermined machining margin with respect to a target combustion chamber capacity;

wherein the adjusting the machining margins includes setting the machining margins smaller when the measured height direction distance is larger than a reference height direction distance and setting the machining margins larger when the measured height direction distance is smaller than the reference height direction distance; and wherein the multi-cylinder engine has a compression ratio of 12:1 or higher.

11. The method of claim 1, wherein, in the adjusting step, a ball end mill performs the machining of the machining portions of the recessed parts, defined by machining margins, moving along a circular moving path which is set inward from the arc-shaped portion of the recessed parts of the cylinder head encircling the intake port and the exhaust port.

12. The method of claim 1, wherein the reference surface is formed adjacent to an ignition plug attaching hole.

13. The method of claim 12, wherein, after adjusting machining margins, the ignition plug attaching hole is formed by a mechanical fabrication operation.

\* \* \* \* \*